US009471990B1

(12) United States Patent
Kumar

(10) Patent No.: US 9,471,990 B1
(45) Date of Patent: Oct. 18, 2016

(54) SYSTEMS AND METHODS FOR DETECTION OF BURNT-IN TEXT IN A VIDEO

(71) Applicant: Interra Systems, Inc., Cupertino, CA (US)

(72) Inventor: Bhupender Kumar, Palwal (IN)

(73) Assignee: Interra Systems, Inc., Cupertino, CA (US)

( * ) Notice: Subject to any disclaimer, the term of this patent is extended or adjusted under 35 U.S.C. 154(b) by 0 days.

(21) Appl. No.: 14/887,871

(22) Filed: Oct. 20, 2015

(51) Int. Cl.
*G06K 9/34* (2006.01)
*G06T 7/00* (2006.01)

(52) U.S. Cl.
CPC ... *G06T 7/0081* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 6,614,930 B1* | 9/2003 | Agnihotri | ............... | G06K 9/325 382/173 |
| 9,036,083 B1* | 5/2015 | Zhu | ............... | H04N 5/445 348/465 |
| 2004/0255249 A1* | 12/2004 | Chang | ............... | G06F 17/30796 715/723 |
| 2005/0196043 A1* | 9/2005 | Jung | ............... | G06K 9/325 382/176 |
| 2007/0110322 A1* | 5/2007 | Yuille | ............... | G06K 9/325 382/227 |
| 2008/0143880 A1* | 6/2008 | Jung | ............... | G06K 9/3266 348/571 |
| 2013/0129216 A1* | 5/2013 | Tsai | ............... | G06K 9/325 382/170 |
| 2015/0356740 A1* | 12/2015 | Subbaian | ............... | G06K 9/6267 382/176 |

OTHER PUBLICATIONS

Jung, Keechul, Kwang In Kim, and Anil K. Jain. "Text information extraction in images and video: a survey." Pattern recognition 37.5 (2004): 977-997.*
Chen, Datong, Jean-Marc Odobez, and Herve Bourlard. "Text detection and recognition in images and video frames." Pattern recognition 37.3 (2004): 595-608.*
Li, Huiping, David Doermann, and Omid Kia. "Automatic text detection and tracking in digital video." IEEE transactions on image processing 9.1 (2000): 147-156.*
Agnihotri, Lalitha, and Nevenka Dimitrova. "Text detection for video analysis." Content-Based Access of Image and Video Libraries, 1999.(CBAIVL'99) Proceedings. IEEE Workshop on. IEEE, 1999.*
Xi, Jie, et al. "A Video Text Detection and Recognition System." ICME. 2001.*
Qian, Xueming, et al. "Text detection, localization, and tracking in compressed video." Signal Processing: Image Communication 22.9 (2007): 752-768.*

* cited by examiner

*Primary Examiner* — Li Liu
(74) *Attorney, Agent, or Firm* — Next ip Law Group

(57) ABSTRACT

A method and a system implementing the method for detecting presence of burnt-in text in a video sequence are described. Initially, possible text candidates are separated from the background information. Individual candidates are then validated against the character features like similar font width, resolution, width height ratio, etc. These characters are further validated for the formation of words/sentences. Finally, the temporal features are used for validation for determining valid burnt-in text candidates.

13 Claims, 14 Drawing Sheets

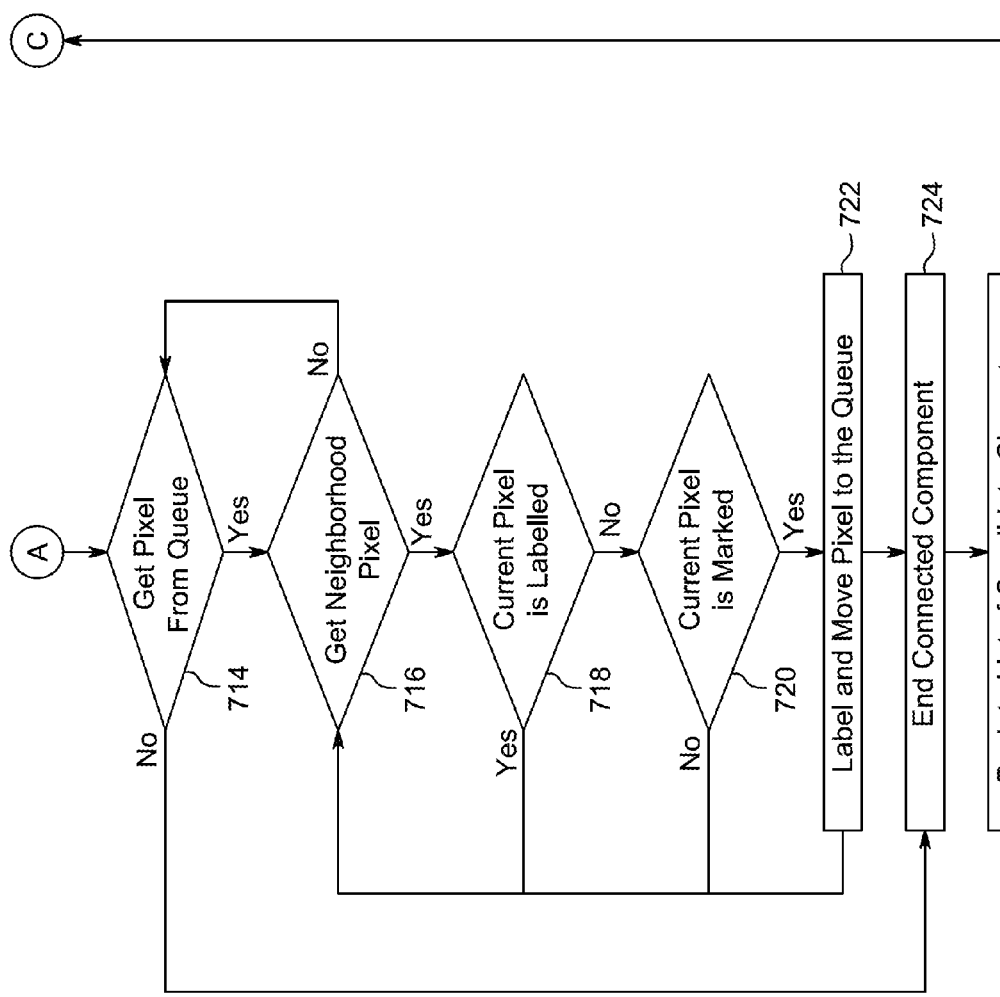

SYSTEMS AND METHODS FOR DETECTION OF BURNT-IN TEXT IN A VIDEO

FIELD OF THE DISCLOSURE

The presently disclosed embodiments are generally related to text detection in a video, and more particularly to detection of open caption text present in a video.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

A video is a time-based media storage format for moving pictures information. A video may be described as a series of pictures or frames that are displayed at a rapid rate known as a frame rate which is the number of frames displayed in a second. Each frame is composed of elements called pixels that can be illuminated or darkened on a display screen. Resolution of a frame depends on the number of pixels present in a frame. Further, overall quality of a video varies depending on a number of factors such as the number of frames per second, colour space, resolution, and the like. A video apart from a number of sequenced frames may also comprise of an audio stream that adds to the content of the video and can be played by means of audio output devices such as speakers. However, the audio stream of a video may be in a specific language that may not be understood by viewers, for example, viewers who are not native speakers of the language used in the video. Moreover, in case a video is being viewed by a hearing impaired person, the video may not be fully understood.

For ease of use, a video may include written text called captions that may accompany the video. Captions may display text that transcribes the narration and provides descriptions of the dialogues and sounds that are present in a video. Captions are generally synchronized with the video frame so that the viewers can understand the content of the video that is presented, regardless of whether or not the viewer is able to understand the audio. There are two ways for embedding captions in a video namely closed captions and open captions. Closed captions can be toggled on/off and are embedded using a timed-text file which is created by adding time codes to a transcript of the video. Delivering video products with closed captions places responsibility on the viewer to understand how to turn on the captions, either on their television sets or in their media viewer software. For simplifying the use, open captions are preferred where the text is burnt-in to the frames such that they are visible whenever the video is viewed, i.e. textual information (like subtitles, credits, titles, slates, etc.) is burnt into a video such that it becomes a part of the frame data. Open captions are always present over the frames of the video and can't be toggled on/off, and no additional player functionality is required for presenting the open captions. Moreover, the open captions are added during the video editing process. Unlike closed captions where the textual information provided in a separate channel using text files or encoded files, the burnt in text is provided in the same channel as that of the video.

In media workflow, it is very important to have a method and a system implementing the method for detecting whether or not the captions have been inserted properly with-in the video before broadcast. However, it is not possible to validate the textual data semantically without extracting the data out of the video. Hence, the main requirement for such a system would be to detect the presence of burnt-in text within the video. Unlike closed captions where separate text files containing textual information or separate channel carrying encoded text information is present, it is difficult to validate burnt-in information in case of open captions without detection of text in a frame. Only after detection, textual information can be validated for its positioning, paint style, language, and the like.

There are many methods that claim to meet the above mentioned requirements, however, each method has its drawbacks. The existing methods suffer from a very high miss rate as they are specifically dependent on certain characteristics of the text burnt-in the video such as statistical characteristics, angular point characteristic, caption box and many more which are not universal and may vary from one video to another. Moreover, current state of art for detection of textual information present in open captions is not able to handle the text with different font sizes, different formatting, and different languages. So, there exists a need for detection of burnt in text in any video format and not just relying on certain text characteristics. In the current disclosure, a new method and system for detection of burnt-in text within a video is described that works properly for a wider range of text characteristics.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an embodiment, a method for detecting open caption text in a video is provided. The method comprises marking location of one or more pixels present in each frame of the video in a threshold marked buffer, the pixel is marked in the threshold marked buffer if the difference between pixel value of the pixel in an original frame and pixel value of the pixel in a filtered frame is above a first predefined threshold. Then, marking location of one or more pixels present in each frame of the video in a text candidate map buffer, the pixels lying in a high density region are marked by calculating spatial discontinuity at each pixel. A neighbourhood size based on coarse font size is determined, wherein the neighbourhood size is a multiple of the coarse font size. Then, one or more seed pixels are determined by comparing for each pixel marked in the text candidate map buffer, the number of marked pixels in the text candidate map buffer within the neighbourhood size with a second predefined threshold, wherein if the number of marked pixels in the text candidate map buffer within the neighbourhood size is greater than the second predefined threshold then that pixel is determined as a seed pixel. Thereafter, one or more connected components are determined by using the threshold marked buffer, wherein pixels in the neighbourhood of each seed pixel in the threshold marked buffer are determined, then all the neighbouring pixels that are marked in the threshold marked buffer are connected for determining a candidate character. Then, one or more connected components are determined by using the text candidate map buffer, wherein pixels in the neighbourhood of each seed pixel in text candidate map buffer are determined, then, all the neighbouring pixels that are marked in the text candidate map buffer are connected for determining a candidate character. One or more valid candidates are determined, wherein the valid candidates are one or more connected components having width to height ratio above a third predefined threshold, height within a first predefined range, and having a uniform font width. One or more moments of the one or more valid candidates are computed, the moments of the valid candidates include mean and variance. One or more valid candidates are clustered together if the font width and moments of the one or more valid candidates are in a second predefined range. Then, one or more valid clusters are determined by analyzing the valid candidates within each of the one or more clusters, wherein a valid cluster has spatially neighbouring connected components. Thereafter, a motion profile of each of the one or more frames are determined, wherein the motion profile includes a measure of the displacement of the one or more valid candidates in the one or more valid clusters for consecutive frames or fields. Finally, the motion profile of all the frames in the video is analyzed for determining uniformity in the frames by comparing the motion profile of a pair of current frame or field and previous frame or field.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. Boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIGS. 7a and 7b illustrate a method for extracting connected components from marked seed pixels, according to an embodiment.

DETAILED DESCRIPTION

Some embodiments of this disclosure, illustrating all its moments, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
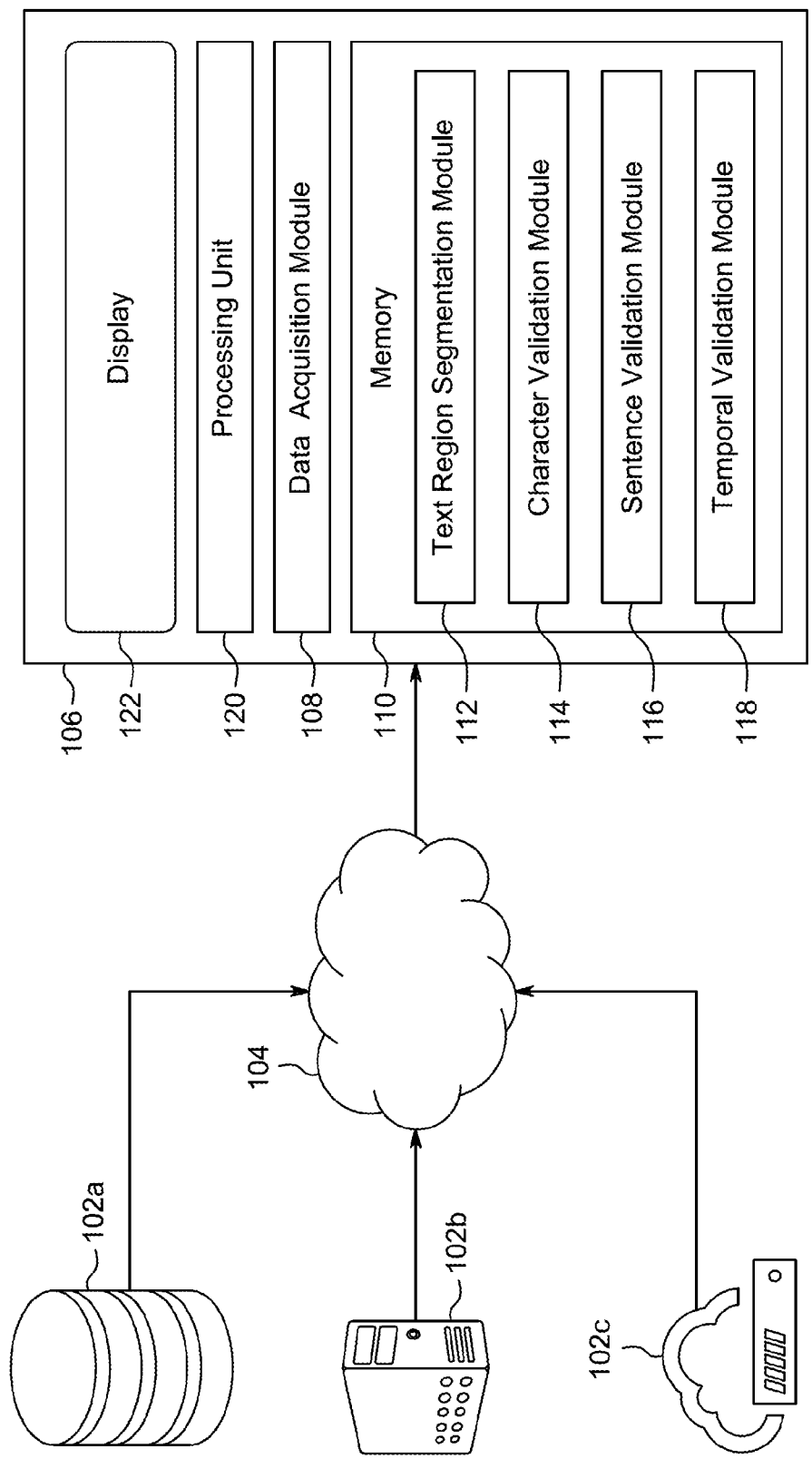
FIG. 1 is a block diagram of a system for detecting burnt-in text in a video, according to an embodiment.

FIG. 1 is a block diagram of a system for detecting burnt-in text in a video, according to an embodiment. According to an embodiment, video signals may be retrieved from one of the one or more heterogeneous sources such as a video database 102a, server 102b, cloud storage 102c, any other storage means connected to a computing device 106. The computing device 106 may be connected to the sources by means of a network 104 such as a local area network, internet, and the like. The computing device 106 is configured for detecting burnt-in text in the retrieved video according to the methods described herein. In an aspect, the computing device 106 may be a laptop, desktop, smartphone, or any other apparatus having at least a memory means and a processor. In certain aspects, the video may be stored in a memory means of the computing device and no external source may be required. The computing device 106 comprises at least of a data acquisition unit 108, memory 110, processing unit 120, and a display 122. The data acquisition unit 108 of the computing device 106 is configured for acquiring the video from one or more sources (102a, 102b, and 102c) or memory 110.

Memory 110 includes a computer readable medium including volatile and/or non-volatile storage components, such as optical, magnetic, organic or other memory or disc storage, which may be integrated in whole or in part with a processor, such as processing unit 120. Alternatively, the memory may be remotely located and coupled to the processing unit 120 by connection mechanism and/or network cable. Memory 110 is enabled to store various types of data. For instance, memory 110 may store one or more identifiers related to the computing device 106 and computer-readable program instructions executable by the processing unit 120. In an aspect, the memory 110 may store the video that needs to be analyzed. The memory 110 also comprises of one or more programming modules that are executed by the processing unit 120. The memory 110 may comprise of a text region segmentation module 112, a character validation module 114, a sentence validation module 116, and a temporal validation module 118. The data acquisition unit 108 further passes the data to the processing unit 120 which processes the video signal according to the programming modules and detects the burnt-in text. In an aspect, the detected burnt-in text may be further analyzed or processed as required such as the burnt-in text may be displayed on the display screen 122, or may be deleted from the video.

The processing unit 120 executes computer program instructions stored in the memory 110. The processing unit 120 is also configured to decode and execute any instructions received from the external sources through the network 104. The processing unit 120 may also execute one or more client applications. The processing unit 120 may include one or more general purpose processors (e.g., INTEL microprocessors) and/or one or more special purpose processors (e.g., digital signal processors). Processing unit 120 is configured to execute computer-readable program instructions, such as program instructions to carry out any of the functions described in this description.

The display 122 is configured to display information received by the computing device 106 and also the result of one or more steps executed by the processing unit 120. Display 122 includes any of a variety of user interface components. For example, display 122 includes a display for displaying data to a user, such as mobility device reference data and/or a message for prompting a user to enter data. The display includes a liquid crystal display (LCD) display, a cathode ray tube (CRT) display, a plasma display, or another type of display. As another example, display 122 may be integrated with the input unit and include a data entry component, such as a keyboard in a QWERTY keyboard arrangement, a touch screen such as a resistive or capacitive touch screen, or another type of data entry component.

Figure 2:
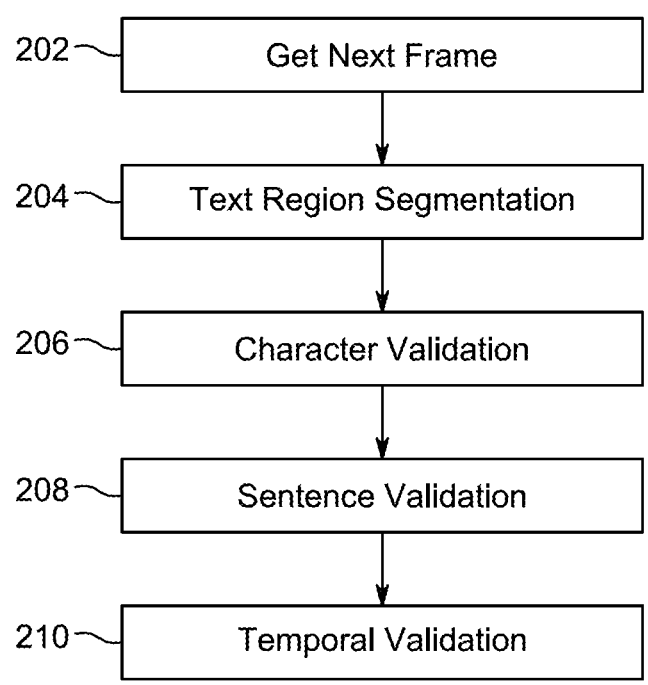
FIG. 2 is a flowchart illustrating a method for detecting burnt-in text in a video, according to an embodiment.

FIG. 2 is a flowchart illustrating a method for detecting burnt-in text in a video, according to an embodiment. The method steps may be executed by the processing unit 120 such that a plurality of steps may be executed in parallel or in sequential order. At step 202, a frame is extracted from the video sequence. A video sequence may comprise of a plurality of frames and the method may be applied to each frame in sequence or a set of frames may be processed in parallel. In an aspect, the method may be applied on either a frame by frame basis or may be applied on field by field basis.

At step 204, probable text region is segmented from the background. In an aspect, the text region segmentation may be achieved by using adaptive thresholding and adaptive edge density moments. The text region segmentation module 112 when executed by the processing unit 120 enables text region segmentation. FIG. 3-FIG. 7b describe in detail the various steps involved in text region segmentation.

Figure 8A:
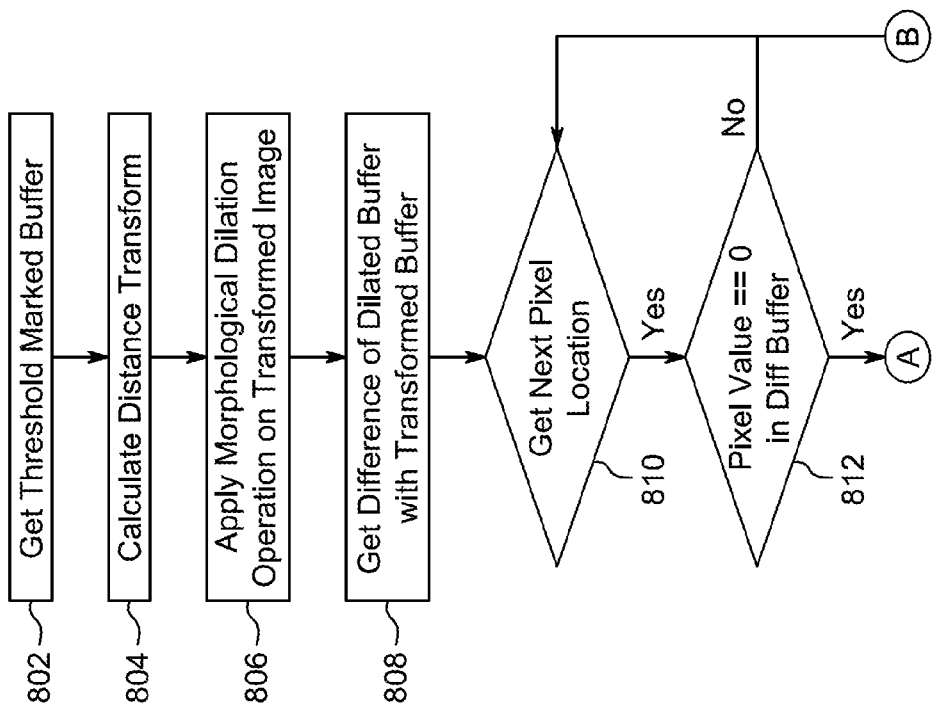
FIGS. 8a and 8b illustrate a method for calculating font width of a candidate, according to an embodiment.
Figure 8B:
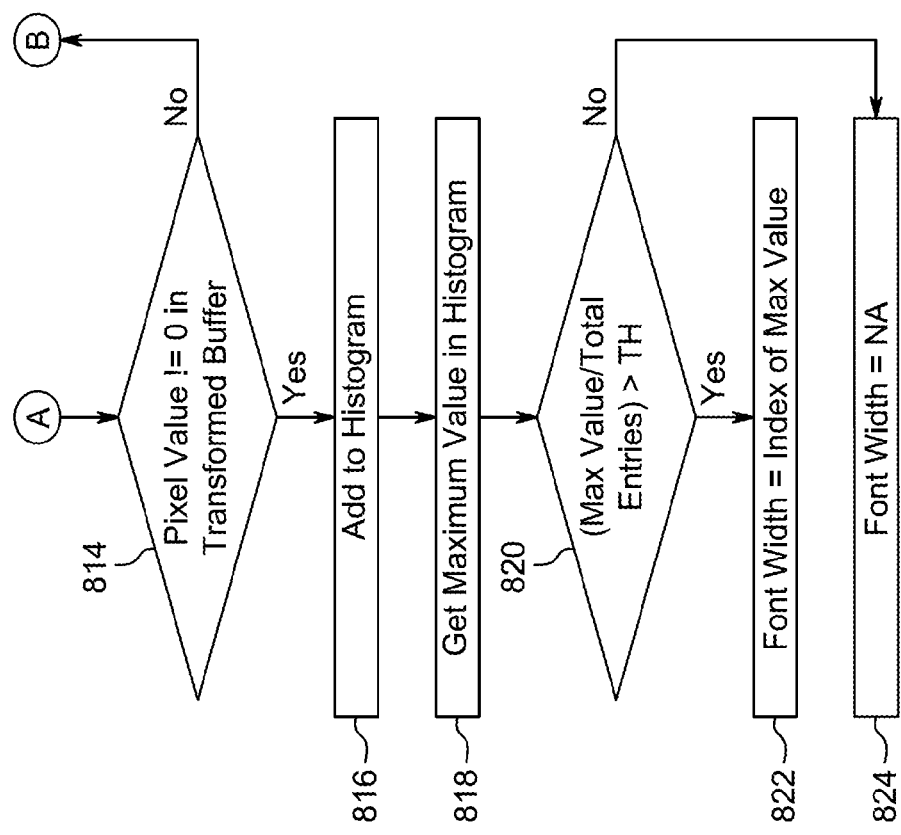
Figure 9:
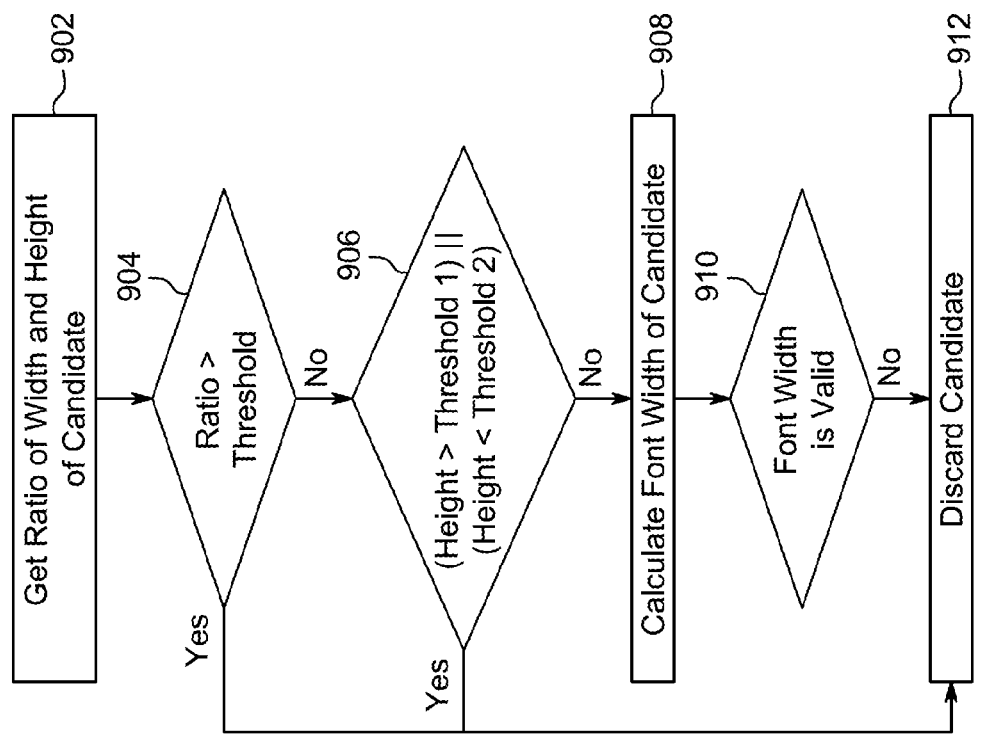
FIG. 9 is a flowchart illustrating a method for determining valid candidates, according to an embodiment.

At step 206, individual candidates are validated against the character moments such as similar font width, character size, width to height ratio, and the like. The character validation module 114 when executed by the processing unit 120 validates the candidates as valid characters. FIGS. 8a, 8b, and 9 describe in detail the various steps involved in character validation.

Figure 10:
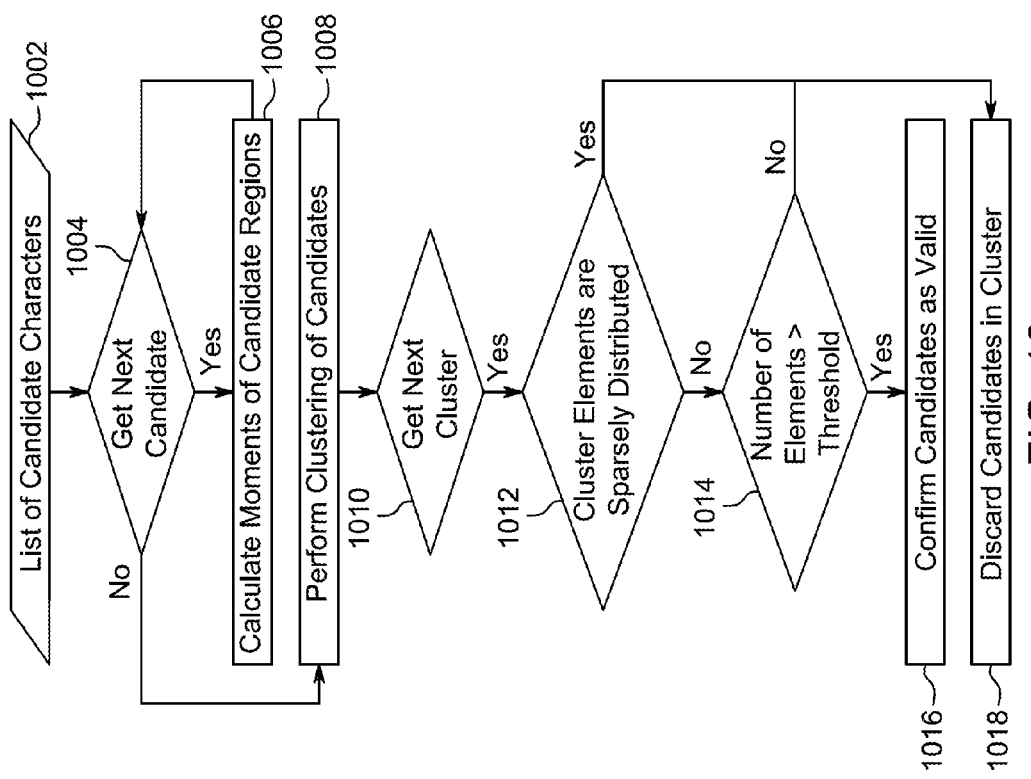
FIG. 10 is a flowchart illustrating a method for clustering candidates and validating candidates in a cluster, according to an embodiment.

At step 208, the candidates identified as valid characters are further validated for detecting the formation of words/sentences. Such validation may consider that words/sentences are grouped based on similarity of textual moments. The sentence validation module 116 when executed by the processing unit 120 validates the candidates as valid words/sentences. FIG. 10 describes in detail the various steps involved in sentence validation.

Figure 11:
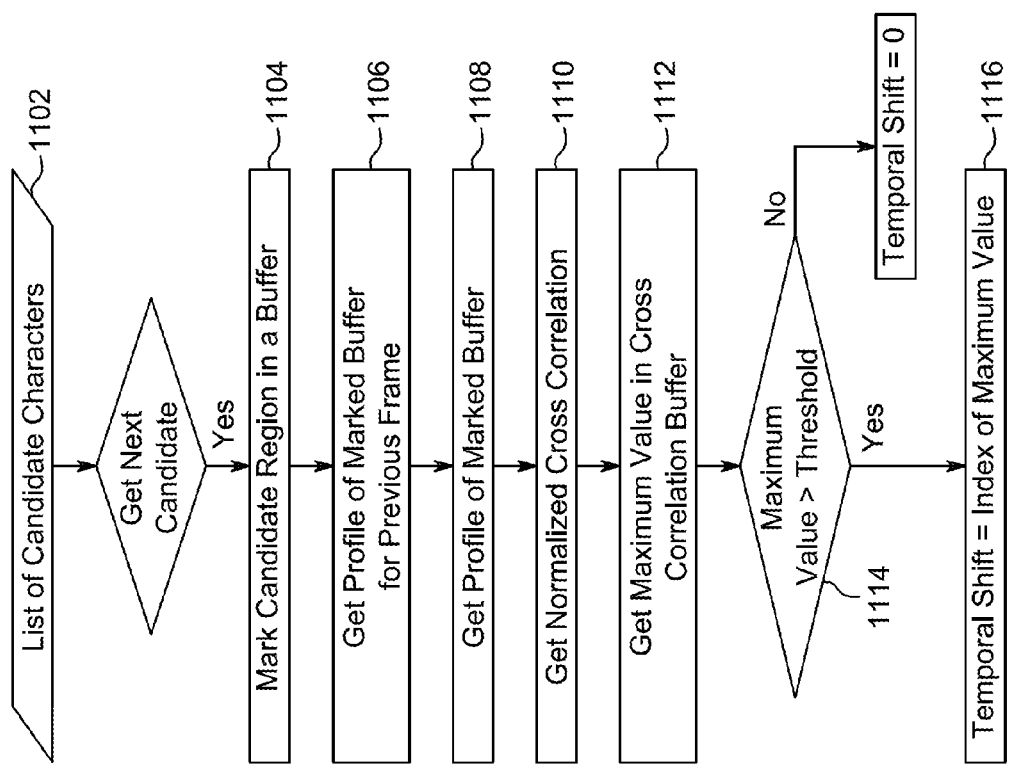
FIG. 11 is a flowchart illustrating a method for computing motion profiles of detected text regions, according to an embodiment.
Figure 12:
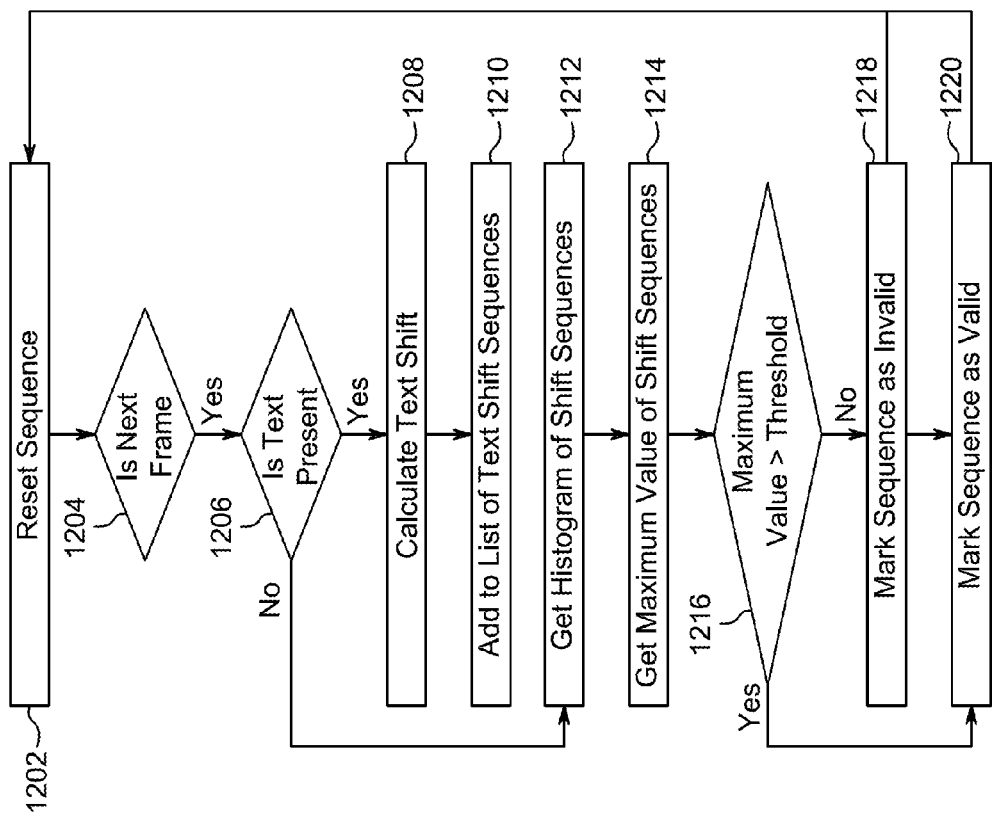
FIG. 12 is a flowchart illustrating a method for analyzing motion profiles of detected text regions and determining valid burnt-in text regions, according to an embodiment.

At step 210, the candidates identified as valid words/sentences are further validated for determining consistent temporal features such as uniform motion, temporal similarity, and the like. The temporal validation module 118 when executed by the processing unit 120 validates the candidates as having consistent temporal moments. FIGS. 11 and 12 describe in detail the various steps involved in sentence validation.

Figure 3:
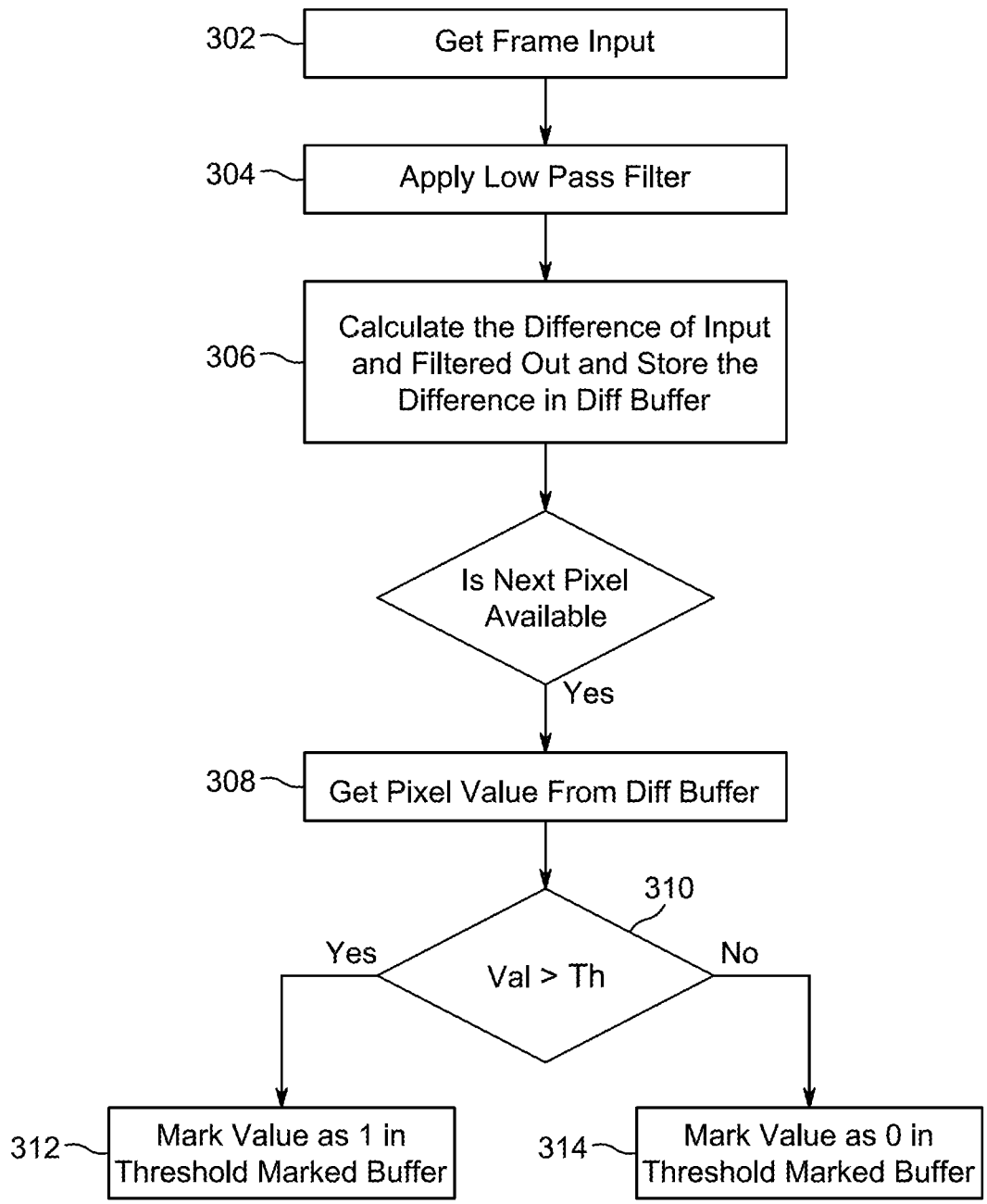
FIG. 3 is a flowchart illustrating a method for marking pixel values in a threshold mark buffer for text segmentation, according to an embodiment.

Text region segmentation starts with marking pixel values in a threshold mark buffer. FIG. 3 is a flowchart illustrating a method for marking pixel values in a threshold mark buffer for text segmentation, according to an embodiment. For segmenting the plateau structures, adaptive thresholding is employed. The processing may be done on frame by frame basis or a set of frames may be processed in parallel. At step 304, a low pass filter of a predetermined size is applied over the input frame data. The size of the low pass filter may be empirically determined. In an aspect, the filter may be a box filter, a Gaussian filter, or any other filter with desired characteristics. At step 306, a difference between the original input frame and the filtered output is calculated and the difference value is stored in a diff buffer. Then at step 308, the difference value is retrieved from the diff buffer and at step 310, the difference value is compared with a first predefined threshold. In case, the difference is more than the first predefined threshold for any pixel, then at step 312, such a pixel is marked as an active location in a threshold marked buffer (TMB). In another case, if the difference is less than the first predefined threshold for a pixel, then at step 314, such a pixel is marked as a non-active location in the threshold marked buffer (TMB).

Figure 4:
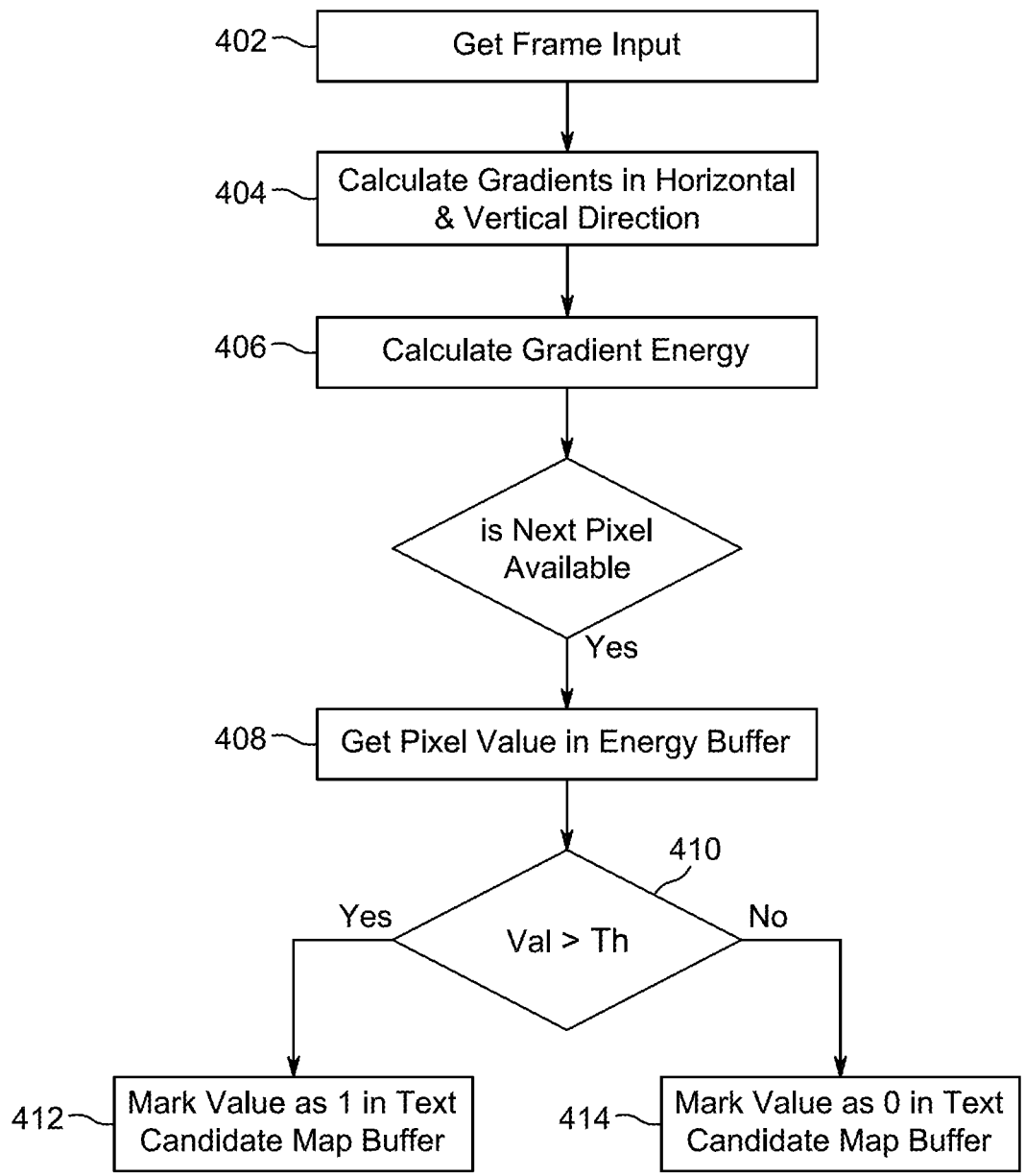
FIG. 4 is a flowchart illustrating a method for marking pixel values in a text candidate map buffer for text segmentation, according to an embodiment.

Text segmentation also requires extraction of high density regions in an frame for which spatial discontinuity at each pixel location of each frame is needed. The spatial discontinuity may be calculated by means of a number of methods such as wavelet transform, first order gradients, and the like. In an embodiment, FIG. 4 is a flowchart illustrating a method for marking pixel values in a text candidate map buffer for text segmentation, according to an embodiment. At step 404, a horizontal difference value for each pixel of each frame is calculated by determining difference between two consecutive pixels in the horizontal direction. Similarly, a vertical difference value for each pixel of each frame is calculated by determining difference between two consecutive pixels in the vertical direction. At step 406, the horizontal difference value and the vertical difference value is used for calculating a gradient energy for each pixel location. At step 408, the gradient energy for each pixel is stored in an output buffer. These gradient energy values for each pixel are then compared with a second predefined threshold, at step 410. In case, the gradient energy value for a pixel is greater than the second predefined threshold, then at step 412, such a pixel is marked as active in a Text Candidate Map buffer (TCMB). In another case, if the gradient energy for a pixel is less than the second predefined threshold, then at step 414, such a pixel is marked as a non-active in the Text Candidate Map buffer (TCMB). It must be noted that though the described method utilizes first order gradients, however, similar output may also be achieved using Wavelet transforms, second or higher order gradient methods and the same can be decided by experts in this area.

Figure 5:
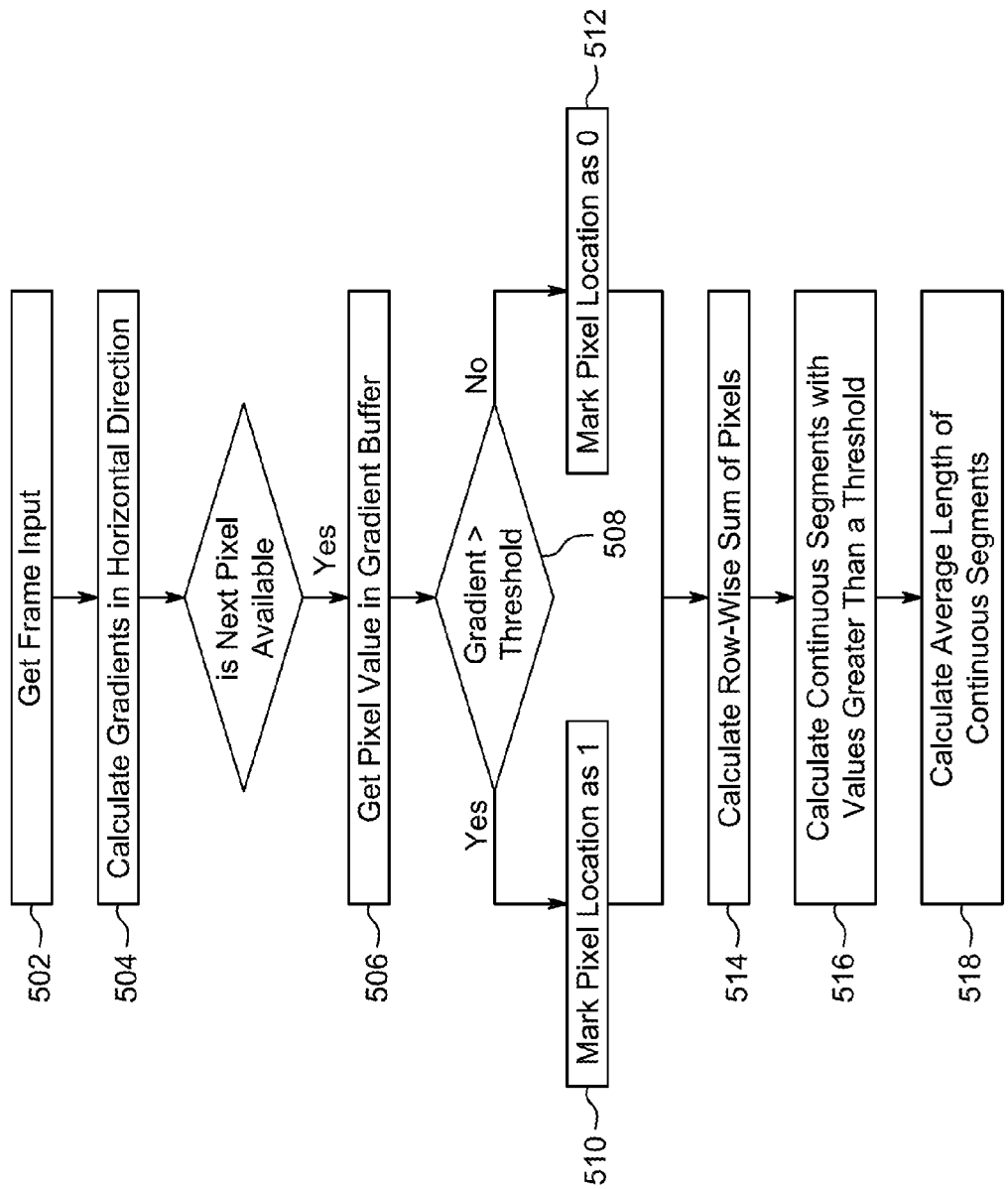
FIG. 5 is a flowchart illustrating a method for determining coarse font size, according to an embodiment.

FIG. 5 is a flowchart illustrating a method for determining coarse font size, according to an embodiment. At step 504, an absolute difference of each pixel with its neighbouring pixel in horizontal direction is calculated. The absolute difference values for each pixel are stored in a gradient buffer, at step 506. At step 508, the absolute difference for each pixel is compared against a third predefined threshold. In case, the absolute difference for a pixel is greater than the third predefined threshold, then at step 510, such a pixel is marked as active in a buffer. In another case, if the absolute difference for a pixel is less than the third predefined threshold, then at step 512, such a pixel is marked as a non-active in the buffer. At step 514, a row-wise sum of all the active pixels is determined i.e. the total number of active pixels in each row is determined. At step 516, an average number of active pixels per row is calculated and the total number of active pixels in each row is compared with this average number. If the total number of active pixels in a row is more than a threshold determined by the average number, then such a row is marked as active. Continuous marked segments are determined on the basis of continuously marked active lines. At step 518, an average length of the all the continuous segments is calculated that is used as a coarse font width.

Figure 6:
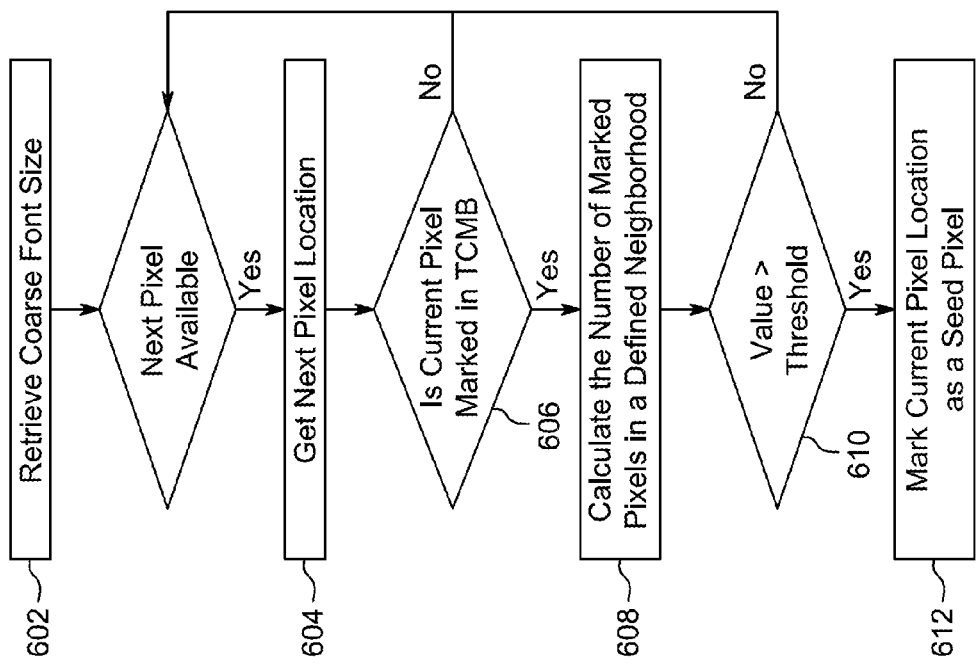
FIG. 6 is a flowchart illustrating a method for determining a seed pixel, according to an embodiment.

FIG. 6 is a flowchart illustrating a method for determining a seed pixel, according to an embodiment. At step 602, the coarse font size calculated in FIG. 5 is retrieved and used for defining a neighbourhood size. At step 606, pixels marked active in the Threshold marked buffer (TMB) are detected. At step 608, for each pixel marked in the Threshold marked buffer (TMB) the total number of marked pixels with-in the defined neighbourhood is calculated. The neighbourhood size is determined by coarse font size.

At step 610, the total number of marked pixels with-in the defined neighbourhood are compared against a fourth predefined threshold. In case, the number of marked pixels is more than the fourth predefined threshold, then at step 612 the current pixel is marked as a seed pixel.

Figure 7A:
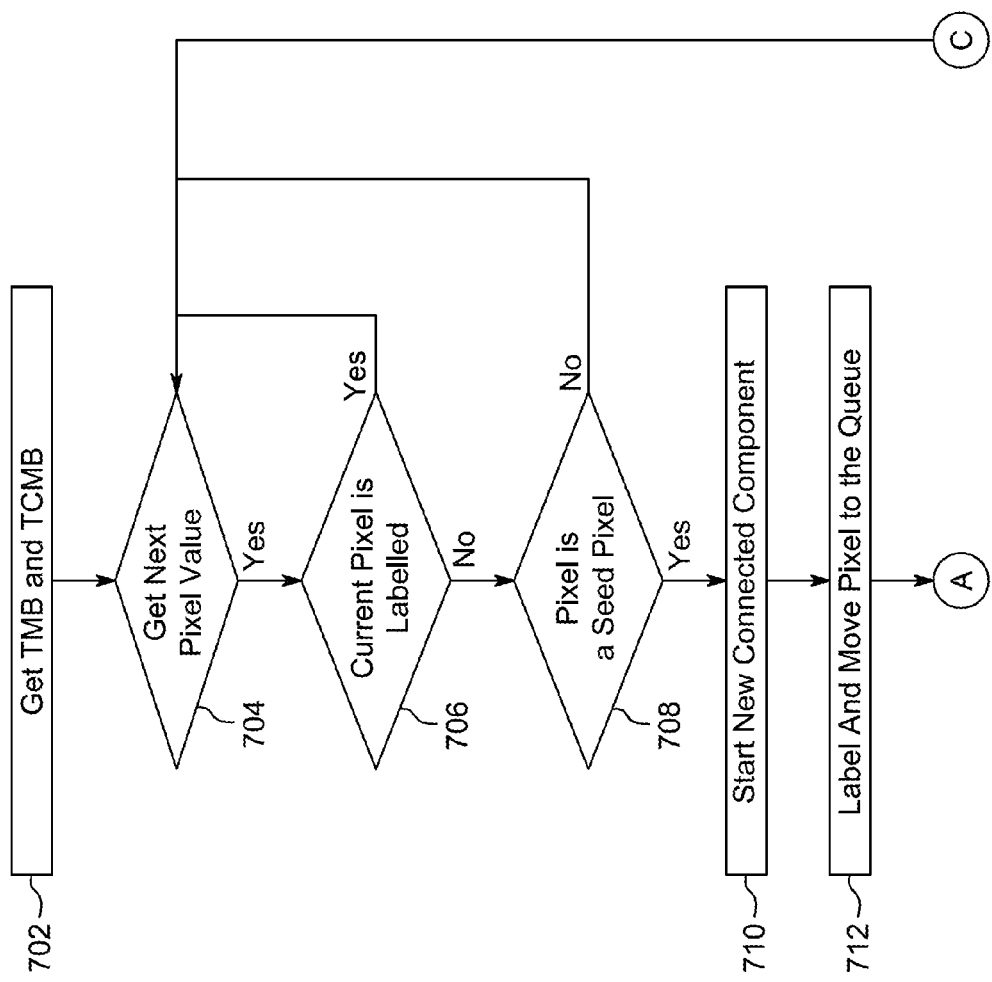

FIGS. 7a and 7b illustrate a method for extracting connected components from marked seed pixels, according to an embodiment. Connected components (CCs) are extracted from both the Threshold marked buffer (TMB) and the Text Candidate Map buffer (TCMB). At step 702, the Threshold marked buffer (TMB) and the Text Candidate Map buffer (TCMB) are retrieved for analysis. In an aspect, the pixels in the Threshold marked buffer (TMB) and the Text Candidate Map buffer (TCMB) are analyzed in parallel. At step 704, a pixel is retrieved from the buffer. Then at step 706, the fetched pixel/current pixel is checked to determine whether the pixel is already labelled as a part of a connected component. In case, the pixel is already labelled then next pixel from the buffer is retrieved, else the pixel that has not been labelled is further analysed. The fetched pixel/current pixel is checked to determine whether the pixel is a seed pixel, at step 708. In case the pixel is determined to be a seed pixel, then at step 710, a new connected component is started. At step 712, the pixel that is determined to be a seed pixel is labelled and moved to a queue. At step 714, all the pixels that are present in the queue are then retrieved and further analyzed. For each seed pixel its neighbouring pixels are retrieved at step 716 for further analysis. In an aspect, the neighbourhood size is set as 8. At step 718, it is determined whether a neighbouring pixel is labelled or not. In case, the neighbouring pixel is already labelled then the next neighbouring pixel for the seed pixel is retrieved for analysis. If the neighbouring pixel is not labelled then, at step 720, it is determined whether the neighbouring pixel is marked in the buffer. In case, the neighbouring pixel is marked in the buffer then the neighbouring pixel is labelled and moved to a queue, at step 722. After analyzing the entire neighbourhood of seed pixel until there are no more pixels present in the queue, end is marked for the connected component, at step 724. Similarly, all the seed pixels that have not been already labelled are analyzed. At step 726, all the connected components thus obtained are pushed to a list of candidate characters.

In an aspect, for extracting connected components an algorithm such as flood-fill algorithm or scanline fill algorithm may be used. In embodiment, all the pixels with-in the TMB as well as TCMB are scanned. All the seed pixels in the buffers and their neighbourhood pixels are checked if they are marked in the buffer and also checked for connectivity. Connected component extraction process is completed when there are no pixels left in queue.

FIGS. 8a and 8b illustrate a method for calculating font width of a candidate, according to an embodiment. FIG. 8a describes this validation process, at step 802, the connected components are retrieved. At step 804, distance transform of the bounding box of such valid connected components is calculated and stored in an frame buffer. Then at step 806, morphological dilation operation is performed on this transformed frame buffer. At step 808, difference between the transformed frame buffer and the dilated frame buffer is calculated. The difference is then checked at step 812, and the pixels having transformed frame buffer equal to the dilated frame buffer i.e. the pixels for which the difference buffer is equal to zero are further analyzed. At step 814, the pixels having transformed frame buffer not equal to zero are further analyzed. At step 816, histogram of such shortlisted pixels is calculated by utilizing the values in the distance transformed buffer. In this histogram, the ratio of maximum value at an index to the total number of entries is calculated and compared against a threshold, at step 820. At step 824, if the ratio is greater than the threshold then index of the maximum value is saved as the font width of the component.

FIG. 9 is a flowchart illustrating a method for determining valid candidates, according to an embodiment. At step 902, the ratio of width and height of the candidate is calculated and this ratio is compared against a predetermined threshold at step 904. The candidates having ratio is found greater than the threshold are discarded at step 912. The candidates having ratio of width and height greater than the threshold are further analyzed at step 906, where the height of each candidate is analyzed to be within a predetermined range by comparing the height against a minimum threshold and a maximum threshold. At step 908, the font width of the valid candidate is calculated according to FIGS. 8a and 8b. Finally at step 910, the font of the component is further analyzed for and if the font width is valid then the component is saved as a valid character.

Now the above computed valid characters need to be analyzed and validated for the formation of words/sentences. FIG. 10 is a flowchart illustrating a method for clustering candidates and validating candidates in a cluster, according to an embodiment. At step 1002, the valid characters are retrieved. At step 1004, it is checked whether a valid character is present or not. At step 1006, the moments of the retrieved candidates are calculated. In an aspect, the moments of the candidates may be the mean, variance, and the like of the candidates. After that clustering of these candidates is performed at step 1008, on the basis of moments and font width. In an aspect, two candidates are put in same cluster, if their font widths as well as moments are similar to a predefined extent. For example, if there are three candidates with moment values as 10, 11, 20, then first two candidates can be a part of same cluster and 3rd will be a part of another cluster. In an aspect, K-means clustering may be used for creating clusters.

At step 1010, each of these clusters is retrieved for analysis. At step 1012, each cluster is analyzed for determining whether the majority of text candidates with-in a cluster are sparsely distributed or not. If the candidates in the cluster are spatially neighboring then these candidates are considered to be a part of a sentence else the clusters consisting of very few candidates or sparsely located candidates are discarded. The method of determining sparse distribution comprises of, firstly, the pixel locations of all the text candidates with-in a cluster are marked in a buffer. Then row-wise sum of the marked buffer is calculated in a row buffer. The row buffer values are compared to a predefined threshold and if the values are greater than this threshold, the rows are marked in a Row Marked Buffer. The Row Marked Buffer is then analyzed to compute the length of continuously marked segments. The length of continuously marked segments is determined by finding the number of consecutive rows that are marked in the Row Marked Buffer. The total number of consecutively marked rows in the Row Marked Buffer is the length of that continuously marked segment. The computed length is then compared to another threshold. In case this length is more than the threshold, the text candidates are labelled as spatially neighbouring candidates. At step 1014, the number of text candidates within a cluster is compared with another predefined threshold. If the number of text candidates is greater than the threshold, the spatially neighbouring candidates are considered to be a part of sentence and the candidates are confirmed to be valid, at step 1016. The clusters consisting of very few candidates or sparsely located candidates are discarded, at step 1018.

Once, the candidates are validated for constituting a valid sentence, the same candidates are further analyzed for temporal validation. FIG. 11 is a flowchart illustrating a method for computing motion profiles of detected text regions, according to an embodiment. At step 1104, the regions of the detected candidates for a current frame are marked as 1 in a buffer (all other values will be 0). At step 1106 and 1108, profile of marked buffer for the previous frame as well as for the current frame is retrieved. The profile for a marked buffer for a particular frame includes a sum profile having a row-wise sum. At step 1110, correlation profile of these two sum profiles (current frame and previous frame) is calculated. The point of maximum cross correlation is then determined at step 1112. At step 1114, the maximum correlation value is compared with a threshold and if found more than the threshold, then the index of the maximum value is estimated as the temporal shift at step 1116.

FIG. 12 is a flowchart illustrating a method for analyzing motion profiles of detected text regions and determining valid burnt-in text regions, according to an embodiment. The calculated temporal features are used for validation. It is assumed that the inserted text is temporally uniform from its start till the end of the video and so the temporal motion of the detected text candidates is considered. Motion profiles of the detected text regions are created for the complete sequence by calculating the motion between successive frames. The text shift is basically the temporal shift and added to the list of text shift sequences at step 1210. Then a histogram of shift sequences is calculated at step 1212 and the maximum value in histogram of shift sequences is retrieved out of it at step 1214. At step 1216, the maximum value in histogram is compared against a threshold and if the maximum value in histogram is greater than the threshold, the sequence is finally marked as valid at step 1220. On the contrary if this maximum value is less as compared to the threshold then the sequence is marked as invalid at step 1218. So, if the displacement of text region is uniform throughout the sequence, either it is static or moving at a uniform speed in same direction, then the text region is considered as the detected burnt-in text information else the textual information is considered to be a part of frame (e.g. sign boards, number plates etc).

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for detecting open caption text in a video having a plurality of frames and each frame having a plurality of pixels, the method comprising processor implemented steps of:
    marking location of one or more pixels in a threshold marked buffer if a difference between pixel value of a pixel in an original frame and pixel value of a pixel in a filtered frame is above a first predefined threshold;
    marking location of one or more pixels in the original frame lying in a high density region by calculating spatial discontinuity at each pixel in a text candidate map buffer;
    determining a neighborhood size based on a coarse font size, the neighborhood size being a multiple of the coarse font size;
    determining one or more seed pixels in the threshold marked buffer and the text candidate map buffer, by determining one or more marked pixels in the threshold marked buffer and the text candidate map buffer, having a number of marked pixels within the neighborhood size greater than a second predefined threshold;
    determining one or more connected components, by determining marked pixels of the threshold marked buffer in a first predefined neighborhood of each seed pixel present in the threshold marked buffer and connecting all the marked pixels in the first predefined neighborhood of each seed pixel in the threshold marked buffer and that seed pixel;
    determining one or more connected components, by determining marked pixels of the text candidate map buffer in a second predefined neighborhood of each seed pixel present in the text candidate map buffer and connecting all the marked pixels in the second predefined neighborhood of each seed pixel in the text candidate map buffer and that seed pixel;
    determining one or more valid candidates in the original frame by using the determined one or more connected components, by determining one or more connected components having width to height ratio above a third predefined threshold, and having height within a first predefined range, and having a uniform font width;
    computing one or more moments of the one or more of the determined one or more valid candidates;
    determining one or more clusters by clustering one or more of the determined one or more valid candidates together if the font width and moments of the one or more valid candidates are in a second predefined range;
    determining one or more valid clusters by analyzing the valid candidates within each of the one or more clusters, wherein a valid cluster has spatially neighbouring connected components;
    determining motion profile of each of one or more frames or fields, wherein the motion profile includes a measure of a displacement of the one or more valid candidates in the one or more valid clusters for consecutive frames or fields; and
    analyzing the motion profile of all the frames in the video for determining uniformity in the frames by comparing the motion profile of a pair of current frame and previous frame.

2. The method of claim 1, wherein the filtered frame is determined by filtering the original frame by means of a low-pass filter wherein the low-pass filter is a Box Filter or a Gaussian Filter.

3. The method of claim 1, wherein the spatial discontinuity at each pixel is calculated by applying a Wavelet transform or determining nth-order gradients.

4. The method of claim 1, wherein calculating the spatial discontinuity at each pixel comprises analyzing first order gradients of each pixel by computing a gradient energy for each pixel and determining if the gradient energy is greater than a fourth predefined threshold.

5. The method of claim 1, wherein calculating coarse font size comprises:
    calculating an absolute difference between pixel value of each pixel and pixel value of a pixel present in adjacent location in a row of the pixel;
    marking the pixel location of one or more pixels, if a pixel has absolute difference above a fifth predefined threshold;
    calculating total number of marked pixels in a row and an average number of marked pixels per row;
    marking rows having total number of marked pixels greater than the average number of marked pixels per line; and
    determining the average number of continuously marked rows, wherein the average number of continuously marked rows is the coarse font size.

6. The method as claimed in claim 1, wherein determining uniform font width comprises of:
    determining a distance transformed frame of the one or more connected components having width to height ratio above the third predefined threshold, and height within the first predefined range;
    computing a morphological dilation frame of the distance transformed frame;
    computing a pixel-wise difference between the distance transformed frame and the morphological dilation frame;
    determining a histogram of the non-zero pixels present in the distance transformed frame for which the pixel-wise difference is zero; and
    determining the font width of the valid candidate, by determining the index value of the histogram having the ratio of maximum value to the total number of entries in the histogram greater than or equal to a sixth threshold.

7. The method as claimed in claim 1, wherein determining one or more valid clusters comprises:
    marking one or more valid candidates present m each of the one or more clusters;
    computing a row wise sum of the marked valid candidates present in each of the one or more clusters;
    marking one or more rows as valid if the row wise sum of the marked valid candidates in a row is greater than a seventh threshold; and
    computing length of continuously marked rows and comparing the length with an eighth threshold, if the length is more than the threshold, then the valid candidates are labelled as spatially neighboring candidates.

8. The method as claimed in claim 1, wherein determining the motion profile comprises:
    marking the pixels in the valid candidates of a current frame in a buffer;
    calculating a row wise sum of the marked valid candidates of the current frame in the buffer; and
    calculating a row wise sum of the marked valid candidates of a previous frame in the buffer; and determining a point of maximum correlation between row wise sum profiles of the current frame and the previous frame.

9. The method as claimed in claim 1, wherein analyzing the motion profile comprises:
analyzing the point of maximum correlation between all the consecutive frames of the video and if the point of maximum correlation remains same or moves by a constant and in the same direction then the valid candidates are the burnt-in text.

10. A system for detecting open caption text in a video, the system comprising at least one processor and a memory storing one or more program modules to be executed by the processor, the program modules comprising:
a text region segmentation module having one or more instructions that when executed by the processor is configured to:
mark location of one or more pixels in a threshold marked buffer if a difference between pixel value of a pixel in an original frame and pixel value of a pixel in a filtered frame is above a first predefined threshold;
mark location of one or more pixels in the original frame lying in a high density region by calculating spatial discontinuity at each pixel in a text candidate map buffer;
determine a neighborhood size based on a coarse font size, the neighborhood size being a multiple of the coarse font size;
determine one or more seed pixels in the threshold marked buffer and the text candidate map buffer, by determining one or more marked pixels in the threshold marked buffer and the text candidate map buffer, having a number of marked pixels within the neighborhood size greater than a second predefined threshold;
determine one or more connected components, by determining marked of the threshold marked buffer pixels in a first predefined neighborhood of each seed pixel present in the threshold marked buffer and connecting all the marked pixels in the first predefined neighborhood of each seed pixel in the threshold marked buffer and that seed pixel; and
determine one or more connected components by determining marked pixels of the text candidate map buffer in a second predefined neighborhood of each seed pixel present in the text candidate map buffer and connecting all the marked pixels in the second predefined neighborhood of each seed pixel in the text candidate map buffer and that seed pixel;
a character validation module having one or more instructions that when executed by the processor is configured to:
determine one or more valid candidates in the original frame by using the determined one or more connected components, by determining one or more connected components having width to height ratio above a third predefined threshold, and having height within a first predefined range, and having a uniform font width;
a sentence validation module having one or more instructions that when executed by the processor is configured to:
compute one or more moments of the determined one or more valid candidates;
determine one or more clusters by clustering one or more of the determined one or more valid candidates together if the font width and moments of the one or more valid candidates are in a second predefined range; and
determine one or more valid clusters by analyzing the valid candidates within each of the one or more clusters, wherein a valid cluster has spatially neighboring connected components; and
a temporal validation module having one or more instructions that when executed by the processor is configured to:
determine motion profile of each of one or more frames or fields, wherein the motion profile includes a measure of a displacement of the one or more valid candidates in the one or more valid clusters for consecutive frames or fields; and
analyze the motion profile of all the frames in the video for determining uniformity in the frames by comparing the motion profile of a pair of current frame and previous frame.

11. The system of claim 10, wherein the system further comprising a low pass filter for determining a filtered frame by filtering the original frame.

12. The system of claim 10, wherein the low pass filter is a Box Filter or a Gaussian Filter.

13. A non-transitory computer readable recording medium having a program stored thereon for detecting open caption text in a video, the program being executed by a processor and causing the processor to:
marking location of one or more pixels in a threshold marked buffer if a difference between pixel value of a pixel in an original frame and pixel value of a pixel in a filtered frame is above a first predefined threshold;
marking location of one or more pixels in the original frame lying in a high density region by calculating spatial discontinuity at each pixel in a text candidate map buffer;
determining a neighborhood size based on a coarse font size, the neighborhood size being a multiple of the coarse font size;
determining one or more seed pixels in the threshold marked buffer and the text candidate map buffer, by determining one or more marked pixels in the threshold marked buffer and the text candidate map buffer, having a number of marked pixels within the neighborhood size greater than a second predefined threshold;
determining one or more connected components, by determining marked pixels of the threshold marked buffer in a first predefined neighborhood of each seed pixel present in the threshold marked buffer and connecting all the marked pixels in the first predefined neighborhood of each seed pixel in the threshold marked buffer and that seed pixel;
determining one or more connected components, by determining marked pixels of the text candidate map buffer in a second predefined neighborhood of each seed pixel present in the text candidate map buffer and connecting all the marked pixels in the second predefined neighborhood of each seed pixel in the text candidate map buffer and that seed pixel;
determining one or more valid candidates in the original frame by using the determined one or more connected components, by determining one or more connected components having width to height ratio above a third predefined threshold, and having height within a first predefined range, and having a uniform font width;
computing one or more moments of the determined one or more valid candidates;
determining one or more clusters by clustering one or more of the determined one or more valid candidates together if the font width and moments of the one or more valid candidates are in a second predefined range;

determining one or more valid clusters by analyzing the valid candidates within each of the one or more clusters, wherein a valid cluster has spatially neighboring connected components;

determining motion profile of each of one or more frames or fields, wherein the motion profile includes a measure of a displacement of the one or more valid candidates in the one or more valid clusters for consecutive frames or fields; and analyzing the motion profile of all the frames in the video for determining uniformity in the frames by comparing the motion profile of a pair of current frame and previous frame.

* * * * *